United States Patent
Urushiyama et al.

(10) Patent No.: US 9,181,473 B2
(45) Date of Patent: Nov. 10, 2015

(54) MANGANESE-CONTAINING LITHIUM TRIBORATE THERMOLUMINESCENT PHOSPHOR, AND METHOD FOR PRODUCING SAME

(75) Inventors: Akio Urushiyama, Tokyo (JP); Yuji Tomizawa, Saitama (JP)

(73) Assignee: RIKKYO GAKUIN, Tokyo (JP)

( * ) Notice: Subject to any disclaimer, the term of this patent is extended or adjusted under 35 U.S.C. 154(b) by 151 days.

(21) Appl. No.: 14/008,676

(22) PCT Filed: Mar. 19, 2012

(86) PCT No.: PCT/JP2012/056995
§ 371 (c)(1),
(2), (4) Date: Sep. 30, 2013

(87) PCT Pub. No.: WO2012/132989
PCT Pub. Date: Oct. 4, 2012

(65) Prior Publication Data
US 2014/0021411 A1    Jan. 23, 2014

(30) Foreign Application Priority Data
Mar. 31, 2011    (JP) .................................. 2011-077599

(51) Int. Cl.
C09K 11/63    (2006.01)
C09K 11/08    (2006.01)
C09K 11/02    (2006.01)
C09K 9/00    (2006.01)

(52) U.S. Cl.
CPC ................ *C09K 11/025* (2013.01); *C09K 9/00* (2013.01); *C09K 11/0833* (2013.01); *C09K 11/63* (2013.01)

(58) Field of Classification Search
CPC .................................................... C09K 11/63
See application file for complete search history.

(56) References Cited
U.S. PATENT DOCUMENTS
2011/0253899 A1    10/2011    Urushiyama et al.

FOREIGN PATENT DOCUMENTS
JP    2010-127930 A    6/2010
JP    2011-052179 A    3/2011
WO    WO 2010/064594 A1    6/2010

OTHER PUBLICATIONS

Ozdemir et al, "Investigation of thermoluminescence properties of metal oxide doped lithium triborate", J. Mater. Sci. (Jun. 2007), 42:8501-8508.*
Ozdemir et al; "Investigation of Thermoluminescence Properties of Metal Oxide Doped Lithium Triborate", J. Mater. Sci (2007) 42:8501-8508.
Ogorodnikov et al; "UV-Luminescence and Thermostimulated Processes in Nonlinear Crystals $Lib_3O_5$", Radiation Measurements, vol. 24, No. 4, pp. 423-426, 1995.
ISR of PCT/JP2012/056995 mailed May 29, 2012.
European Search Report of EP12762790.9 issued Aug. 13, 2014.
International Search Report for PCT/JP2012/056995, mailed May 29, 2012.
Holovey et al., "Luminescent Properties of Glassy and Crystallized $(Li_2B_4O_7+xB2O3)_{0.999}(CuO)_{0.001}$ ($x$=0-16.67 mol %) Materials," *Inorganic Materials*, 2006, vol. 42, No. 11, pp. 1265-1272.
Depci et al., "Comparison of Different Synthesis Methods to Produce Lithium Triborate and Their Effects on Its Thermoluminescent Property," *Metallurgical and Materials Transactions A*, Oct. 2010, vol. 41A, pp. 2584-2594.
Ogorodnikov et al., "Tehermally stimulated luminescence and lattice defects in crystals of alkali metal borate $LiB_3O_5$ (LBO)," *Radiation Measurements*, 2001, vol. 33, pp. 577-581.

* cited by examiner

*Primary Examiner* — Carol M Koslow
(74) *Attorney, Agent, or Firm* — Nixon & Vanderhye P.C.

(57) ABSTRACT

The present invention provides a thermoluminescent phosphor for obtaining a two-dimensional or three-dimensional dosimeter for measuring dose absorbed by biological tissues, which phosphor has superior handleability, superior biological tissue equivalence, and superior precision.
It is produced by a method comprising (A1) mixing $Li_2B_4O_7$, $B_2O_3$ and $MnO_2$, (A2) firing the mixture at 770 to 840° C., and (A3) obtaining the thermoluminescent phosphor comprising lithium triborate as a base material and manganese as a luminescent center present in the base material by further adding and mixing $Li_2B_4O_7$ into the fired product and then firing the mixture at 770 to 840° C., wherein the molar ratio of $Li_2B_4O_7:B_2O_3$ in A1 is 1:X ($1<X\leq4$), $MnO_2$ is 0.02 to 1.0 mass % relative to the total mass of the $B_2O_3$ and the total amount of the $Li_2B_4O_7$ added in A1 and A3, and $Li_2B_4O_7$ in A3 is (X-1) mol relative to 1 mol of the $B_2O_3$.

7 Claims, 9 Drawing Sheets

(1-1)

(1-2)

Irradiation with X rays using Elekta linear accelerator (6 MV)

FINGERLAKE electronic cooled CCD camera

Heating on metal plate at 260°C for 480 seconds

Irradiation with electron beams using Elekta linear accelerator (6 MV)

FINGERLAKE electronic cooled CCD camera

Heating on metal plate at 260°C for 480 seconds

Heated at 700°C for 4 hr          Heated at 800°C for 4 hr (The arrows indicate manganese dioxide microparticles.)

Heated at 800°C for 4 hr          Heated at 825°C for 4 hr

Heated at 750°C for 4 hr          Heated at 700°C for 4 hr

MANGANESE-CONTAINING LITHIUM TRIBORATE THERMOLUMINESCENT PHOSPHOR, AND METHOD FOR PRODUCING SAME

This application is the U.S. national phase of International Application No. PCT/JP2012/056995 filed 19 Mar. 2012 which designated the U.S. and claims priority to JP patent application No. 2011-077599 filed 31 Mar. 2011, the entire contents of each of which are hereby incorporated by reference.

TECHNICAL FIELD

The present invention relates to a manganese-containing lithium triborate thermoluminescent phosphor and a method for producing the same.

BACKGROUND ART

Today, radiation therapies for cancers are rapidly developing centering around various irradiation methods, and along with the development, the importance of measurement of three-dimensional absorbed dose is increasing. To evaluate radiation absorbed by the living body, it is necessary to use a dosimeter sensor having the same effective atomic number as that of biological tissues. Dose measured with a sensor having a different effective atomic number cannot be used to measure dose absorbed by biological tissues accurately.

A two-dimensional dose distribution is now obtained by Gafchromic film or imaging plate (IP) photoreceptor. However, since Gafchromic film can be used only once, in-plane sensitivity coefficient cannot be obtained, nor can disrupted images resulting from uneven coating of photoreceptors be corrected. Hence, Gafchromic film has problems in quantitative capability. Further, Gafchromic film has a small dynamic range and this problem imposes many restrictions on use of the film. Meanwhile, since IPs are not biological tissue equivalent, it is virtually impossible to apply IPs to three-dimensional measurement. A method of measuring three-dimensional dose distribution using a molded product of a polymer gel in which a biological tissue-equivalent fluorescent substance is dispersed is also being studied, but the method is highly burdensome in terms of facilities and labor and is not practical.

As a thermoluminescent substance, a copper-containing lithium triborate (Non-patent Document 1) is known. The non-patent document discloses that manganese-containing lithium triborate acts as a thermoluminescent substance, but the document does not refer to a specific synthetic method or characteristics and hence, manganese-containing lithium triborate cannot be produced based on the document. Further, it is reported that pure lithium triborate crystals containing no additives exhibit thermoluminescence (Non-patent Document 2), but the document does not refer to manganese-containing lithium triborate.

CITATION LIST

Non-Patent Documents

Non-patent Document 1: Zeynep Ozdemir, Jemir, Gulhan Ozbayoglu, and Aysen Yilmaz, J. Mater Sci (2007) 42, 8501-8508

Non-patent Document 2: I. N. Ogorodnikov, A. U. Kuznetsov, A. V. Kruzhalov and V. A. Maslov, Radiation Measurements, Vol. 24, No. 4, pp. 423-426 (1995)

SUMMARY OF INVENTION

Technical Problem

As mentioned above, there is a demand for a thermoluminescent phosphor for obtaining a two-dimensional or three-dimensional dosimeter which is superior in handleability, biological tissue equivalence and precision and which is used to measure dose absorbed by biological tissues. However, no satisfactory thermoluminescent phosphor has been available. The present inventors preliminarily studied the techniques disclosed in the aforementioned documents and obtained the finding that the copper-containing lithium triborate disclosed in Non-patent Document 1 has the problem that the thermoluminescence intensity is low. Further, since Non-patent Document 1 does not refer to a specific synthetic method for manganese-containing lithium triborate, the present inventors could not produce it experimentally and study it based on the document. Moreover, the pure lithium triborate crystals disclosed in Non-patent Document 2 have no satisfactory luminescence properties.

In consideration of the foregoing, the present invention aims to provide a thermoluminescent phosphor for obtaining a two-dimensional or three-dimensional dosimeter which is superior in handleability, biological tissue equivalence and precision and which is used to measure dose absorbed by biological tissues.

Solution to Problem

As a result of studies, the present inventors found that the aforementioned object can be achieved by producing a manganese-containing lithium triborate in accordance with a certain method, and this finding led to the completion of the present invention. More specifically, the aforementioned object is achieved by the following inventions.

(1) A method for producing a thermoluminescent phosphor, comprising a step A1 for mixing lithium tetraborate, boron oxide and manganese dioxide, a step A2 for firing the mixture at 770 to 840° C., and a step A3 for obtaining the thermoluminescent phosphor comprising lithium triborate as a base material and manganese as a luminescent center present in the base material by further adding and mixing lithium tetraborate into the above-mentioned fired product and then firing the mixture at 770 to 840° C., wherein the molar ratio between the lithium tetraborate and the boron oxide in the step A1 is 1:X ($1<X\leq 4$), the amount of the manganese dioxide is 0.02 to 1.0 mass % relative to the total mass of the boron oxide and the total amount of the lithium tetraborate added in the steps A1 and A3, and the amount of the lithium tetraborate in the step A3 is (X−1) mol relative to 1 mol of the boron oxide.

(2) A method for producing a thermoluminescent phosphor, comprising a step B1 for mixing lithium tetraborate, boron oxide and manganese dioxide, a step B2 for firing the mixture at 850° C. or more, and a step B3 for obtaining the thermoluminescent phosphor comprising lithium triborate as a base material and manganese as a luminescent center present in the base material by cooling the above-mentioned fired product from 840° C. to 820° C. at a cooling rate of 1.0° C./h or less to convert the fired product, wherein the molar ratio between the lithium tetraborate and the boron oxide in the step B1 is 1:(0.5 to 1.5) and the amount of the manganese dioxide is 0.02 to 1.0 mass % relative to the total mass of the lithium tetraborate and the boron oxide.

Advantageous Effects of Invention

The present invention can provide a thermoluminescent phosphor for obtaining a two-dimensional or three-dimensional dosimeter that is superior in handleability, biological tissue equivalence and precision.

BRIEF DESCRIPTION OF DRAWINGS

FIG. 2 shows the relation between irradiation dose and luminescence intensity.

DESCRIPTION OF EMBODIMENTS

Figure 1:
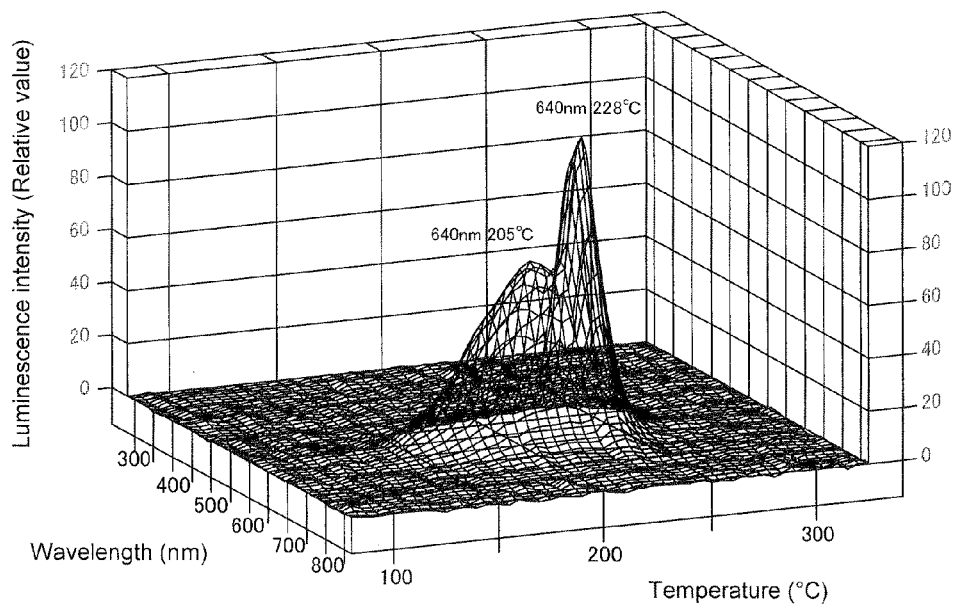
FIGS. 1-1 and 1-2 shows spectral glow curves.
Figure 1:
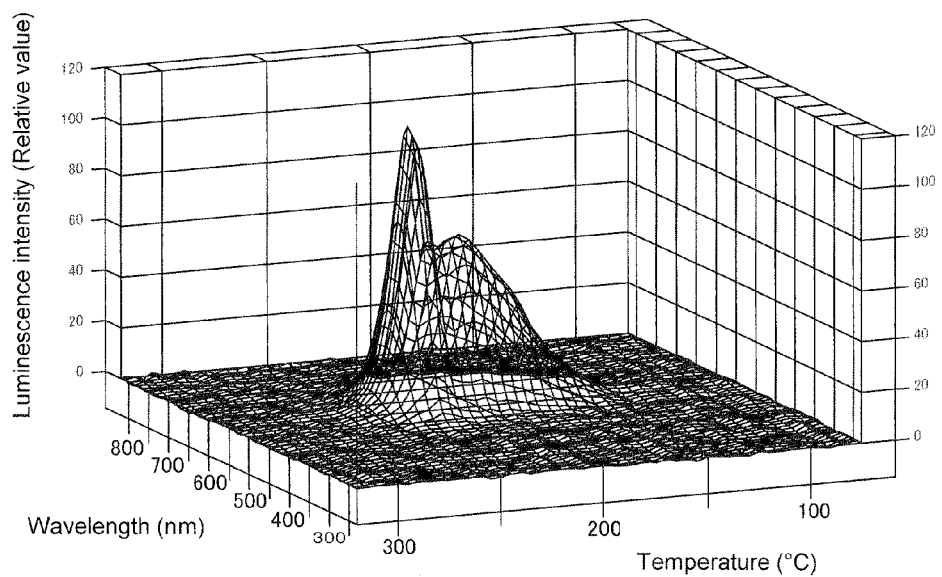

The present invention will be described in detail below. As used herein, "A to B" means values ranging from A to B (both ends inclusive).

1. Production methods

A first production method of the present invention comprises a step A1 for mixing lithium tetraborate, boron oxide and manganese dioxide, a step A2 for firing the mixture at 770 to 840° C., and a step A3 for obtaining a thermoluminescent phosphor comprising lithium triborate as a base material and manganese as a luminescent center present in the base material by further adding and mixing lithium tetraborate into the above-mentioned fired product and then firing the mixture at 770 to 840° C., wherein the molar ratio between the lithium tetraborate and the boron oxide in the step A1 is 1:X (1<X≤4), the amount of the manganese dioxide is 0.02 to 1.0 mass % relative to the total mass of the boron oxide and the total amount of the lithium tetraborate added in the steps A1 and A3, and the amount of the lithium tetraborate in the step A3 is (X−1) mol relative to 1 mol of the boron oxide.

A second production method of the present invention comprises a step B1 for mixing lithium tetraborate, boron oxide and manganese dioxide, a step B2 for firing the mixture at 850° C. or more, and a step B3 for obtaining a thermoluminescent phosphor comprising lithium triborate as a base material and manganese as a luminescent center present in the base material by cooling the above-mentioned fired product from 840° C. to 820° C. at a cooling rate of 1.0° C./h or less to convert the fired product, wherein the molar ratio between the lithium tetraborate and the boron oxide in the step B1 is 1:(0.5 to 1.5) and the amount of the manganese dioxide is 0.02 to 1.0 mass % relative to the total mass of the lithium tetraborate and the boron oxide.

Hereinafter, the thermoluminescent phosphor comprising lithium triborate as a base material and manganese as a luminescent center present in the base material is also referred to as a "manganese-containing lithium triborate" or "$LiB_3O_5$: Mn". The thermoluminescent phosphor is a substance that emits light by heating.

Hereinafter, the production methods of the present invention will be described in the following categories: the first production method and the second production method.

1-1. The first production method (1) Step A1

In this step, lithium tetraborate ($Li_2B_4O_7$), boron oxide ($B_2O_3$) and manganese dioxide ($MnO_2$) are mixed. As the lithium tetraborate, a commercially available product may be generally used, but it preferably has an average particle size of 10 μm or less. As the boron oxide, a commercially available product may be generally used, but it preferably has an average particle size of 20 μm or less. As the manganese dioxide ($MnO_2$), a commercially available product may be generally used, but it preferably has an average particle size of 1 μm or less.

The molar ratio between the lithium tetraborate and the boron oxide in this step is 1:X (1<X≤4). That is, an excessive amount of the boron oxide is used in the step A1. The molar ratio (X) of the boron oxide to 1 mol of the lithium tetraborate exceeds 1 and is equal to or less than 4 and the molar ratio is preferably 2 to 3. When the X falls within the range, a themoluminescent phosphor having high luminescence intensity can be obtained.

The amount of the manganese dioxide is 0.02 to 1.0 mass %, preferably 0.05 to 0.2 mass %, relative to the total mass of the boron oxide and the total amount of the lithium tetraborate. The total amount of the lithium tetraborate is the total amount of the lithium tetraborate used in the step A1 and the lithium tetraborate added in the step A3. The manganese dioxide serves as a luminescent center in the lithium triborate as a base material. Hence, when the amount of the manganese dioxide falls within the range mentioned above, a thermoluminescent phosphor having high luminescence intensity can be obtained. Those components may be mixed using a known means such as a ball mill.

(2) Step A2

In this step, the mixture obtained in the step A1 is fired at 770 to 840° C. By firing at the temperature, a thermoluminescent phosphor having high luminescence intensity can be obtained. The firing temperature is preferably 820 to 840° C., more preferably 820 to 830° C. The firing time is preferably 0.5 hour or longer, preferably 4 hours or longer. Since an excessively long firing time may possibly result in production of a deteriorated fired product, the firing time is preferably 16 hours or less.

In this step, the starting materials are fired but are not completely melted. As a result, a fired product obtained is less likely to adhere to a vessel used for the firing, and hence, it is possible to fire the starting materials on a thin platinum plate or the like. This leads to good workability. The firing is preferably performed under an inert atmosphere.

(3) Step A3

In this step, lithium tetraborate is further added and mixed into the fired product obtained in the step A2 and the mixture is fired at 770 to 840° C. The molar ratio of the lithium tetraborate used at the time to 1 mol of the boron oxide is (X−1) mol, provided that 1<X≤4. That is, the total mole number of the lithium tetraborate used in this step and the lithium tetraborate used in the step A1 is X mol, which is equal to the mole number of the boron oxide. It is preferred that the fired product is once cooled, pulverized and then mixed with the additional lithium tetraborate. The mixing may be performed in the same manner as in the step A1. The firing may be performed in the same manner as in the step A2. Through this step, a manganese-containing lithium triborate can be produced. Also in this step, the fired product is less likely to adhere to a vessel used for the firing. Hence, the workability is good in this step and a high-purity thermoluminescent phosphor can be obtained.

(4) Mechanism

The first production method is characterized by two-step firing and use of excessive boron oxide in the first firing. As described later, $LiB_3O_5$:Mn obtained by such a method has high luminescence brightness.

As shown in a Reference Example described later, even when lithium triborate and manganese dioxide are mixed and subjected to a firing reaction, almost no reaction occurs. In this connection, the present inventors tried reacting equimolar amounts of lithium tetraborate and boron oxide directly at a high temperature in the presence of manganese dioxide. As a result, lithium triborate was synthesized. The present inventors, however, found that since a reaction of equimolar amounts of lithium tetraborate and boron oxide immediately generates lithium triborate, it is difficult to incorporate manganese dioxide into the lithium triborate. Based on this finding, the present inventors enabled $LiB_3O_5$:Mn having high luminescence brightness to be produced by two-step firing using excessive boron oxide in the first firing. The reason $LiB_3O_5$:Mn having high luminescence brightness is produced by the method is not limited; however, it is speculated that the reason is as follows: the use of excessive boron oxide in the first firing results in generation of a liquid phase other than lithium triborate in the reactant; and the presence of the liquid phase helps lithium triborate and manganese dioxide react efficiently.

1-2. The second production method (1) Step B1

In this step, lithium tetraborate, boron oxide and manganese dioxide are mixed. The molar ratio between the lithium tetraborate and the boron oxide is 1:(0.5 to 1.5), preferably 1:1. When the amount of the boron oxide is above the upper limit or below the lower limit, a sufficient amount of lithium triborate is not generated, which prevents production of a thermoluminescent phosphor having high luminescence intensity.

The amount of the manganese dioxide is 0.02 to 1.0 mass %, preferably 0.05 to 0.2 mass %, relative to the total mass of the lithium tetraborate and the boron oxide. The manganese dioxide serves as a luminescent center in the lithium triborate as a base material. Hence, when the amount of the manganese dioxide falls within the range mentioned above, a thermoluminescent phosphor having high luminescence intensity can be obtained. The means for mixing those components is as described in the first production method.

(2) Step B2

In this step, the mixture obtained in the step B1 is fired at 850° C. or more. In this step, the starting materials melt and a reaction proceeds. To proceed with the reaction more efficiently, the firing temperature is preferably 880° C. or more. It is to be noted that since an excessively high temperature may possibly result in deterioration of the starting materials, the firing temperature is preferably 900° C. or less. The firing time is preferably 1 hour or more. However, since an excessively long firing time may possibly result in production of a deteriorated fired product, the firing time is preferably 2 hours or less.

Since the starting materials melt during the firing in this step, the fired product is likely to adhere to a vessel used and it is necessary to apply impact on the vessel to release the fired product. Hence, it is preferable to use a thick vessel.

(3) Step B3

In this step, the fired product obtained in the step B2 is cooled from 840° C. to 820° C. at a cooling rate of 1.0° C./h or less. The fired product obtained in the step B2 in a high-temperature state is a compound other than lithium triborate and converted into lithium triborate by cooling the product slowly from 840° C. to 820° C. in this step. As a result, a manganese-containing lithium triborate ($LiB_3O_5$:Mn) can be obtained. The cooling rate is 1.0° C./h or less, preferably 0.8° C./h or less. When the cooling rate exceeds the upper limit, the conversion does not occur and hence, lithium triborate cannot be obtained. When the cooling rate is too low, the productivity decreases. Hence, the cooling rate is preferably 0.3° C./h or more.

Since the starting materials used in the first and second production methods are commonly available materials, a thermoluminescent phosphor having superior properties can be provided inexpensively by the present invention.

2. Manganese-containing lithium triborate ($LiB_3O_5$:Mn) thermoluminescent phosphor The manganese-containing lithium triborate thermoluminescent phosphor of the present invention comprises lithium triborate as a base material and manganese as a luminescent center and emits light by heating after irradiation with radiation. The manganese-containing lithium triborate thermoluminescent phosphor of the present invention is preferably produced by the aforementioned production methods.

(1) General characteristics

The manganese-containing lithium triborate thermoluminescent phosphor of the present invention is a slightly red crystal and soluble in water and insoluble in organic solvents. The thermoluminescent phosphor is neither deliquescent nor efflorescent, and is stable.

(2) Effective atomic number

The effective atomic number of the manganese-containing lithium triborate of the present invention is 7.3 when the manganese content is 1.0 mass %, and the effective atomic number is very close to that of soft tissues of the human body, 7.4. Hence, a precise radiation dosimeter element can be provided by the present invention.

(3) Thermoluminescence properties

The manganese-containing lithium triborate of the present invention emits red-orange thermoluminescence by heating after irradiation with radiation. FIG. 1 shows spectral glow curves obtained when the manganese-containing lithium triborate was irradiated with CuKα rays, followed by raising temperature at a temperature increase rate of 0.5° C./sec without preliminary heating (pre-annealing). In FIG. 1, FIG. 1-1) is a projection viewed from the forward direction and FIG. 1-2) is a projection viewed from the backward direction. Thermoluminescent components were observed at a temperature range of 70 to 320° C.; two thermoluminescent components (maximum values at 640 nm, 205° C. and at 640 nm, 228° C.) were observed. The manganese-containing lithium triborate of the present invention can be repeatedly used without any deterioration even after observation of fluorescence through heating at about 260° C. following irradiation with radiation.

Among biological tissue-equivalent thermoluminescent substances that have been known so far, there are ones having a plurality of luminescent components at that temperature range and wavelength range, but many of the luminescent components are distributed at a wide temperature range of from a low temperature that is near room temperature to a high temperature of 300° C. or more. Among them, low-temperature components cause instability of dose values which depends on a difference in storage temperature or storage time after irradiation with radiation, and hence, it is necessary to remove the low-temperature components in advance by heating (pre-annealing) thermoluminescent substances at a low temperature. On the other hand, high-temperature components cause instability of dose values during recycling of thermoluminescent substances and hence, it is necessary to remove the high-temperature components by heating (post-annealing) thermoluminescent substances again at a high temperature after use. However, there are two luminescent components in the manganese-containing lithium triborate of the present invention, and the thermoluminescent components are observed at a temperature of 70 to 320° C. while the lithium triborate has no thermoluminescent component at a temperature of at least 0° C. to below 70° C. Further, the luminescence temperatures of the aforementioned two luminescent components are close to each other, and the amount of luminescence can be measured as the total value for the two luminescent components by heating at a temperature range of 140 to 240° C. Thus, neither pre-annealing nor post-annealing is needed and the handleability is superior.

Furthermore, even after the manganese-containing lithium triborate of the present invention is irradiated with radiation and then stored at room temperature for 60 days, the amount of luminescence decreases by 5% or less with very little thermal fading. The absence of the tail of the peak at 140° C. or less in the minimum temperature luminescent component in the temperature range is consistent with the little thermal fading. Owing to the little thermal fading, the manganese-containing lithium triborate of the present invention can be used for long-term measurement of integrated dose values, for example, various environmental measurements. Further, the manganese-containing lithium triborate of the present invention is good in light fading characteristic and the decrease in luminescence intensity is about 5% even when the lithium triborate is exposed to indoor lighting for a whole day and night after irradiation with radiation. The manganese-containing lithium triborate of the present invention does not cause any problems in dose measurement when it is stored in a dark place after irradiation with radiation.

Figure 2:
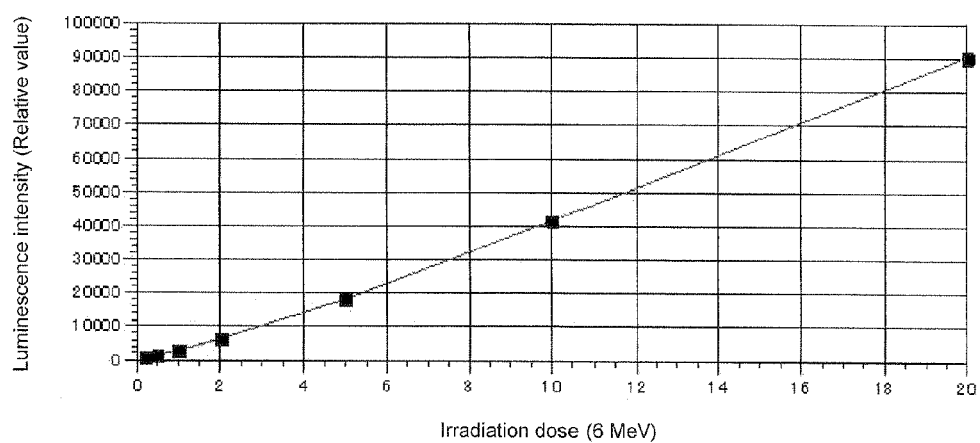
Figure 3:
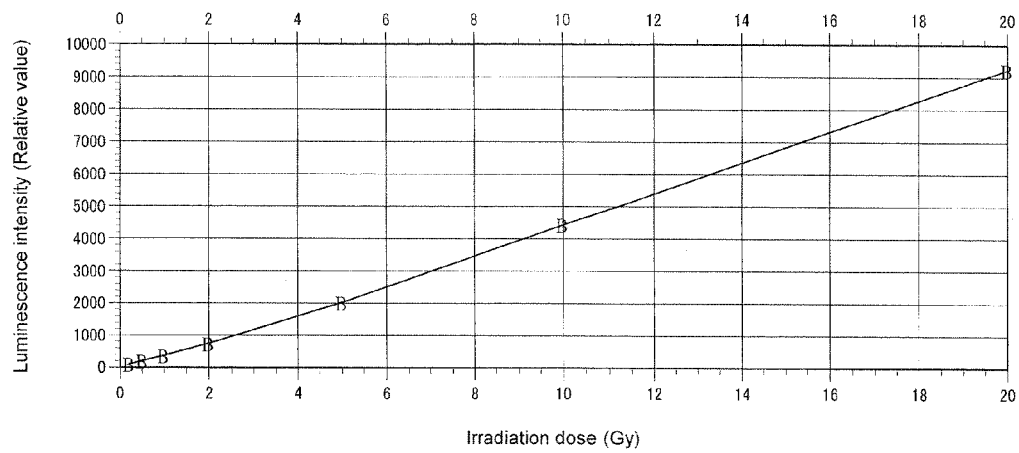
FIG. 3 shows the relation between irradiation dose and luminescence intensity.

FIGS. 2 and 3 each show the relation between the irradiation dose and the luminescence intensity in the case the manganese-containing lithium triborate of the present invention is irradiated with radiation and then heated at 260° C. As for X rays and electron beams, the relation between the irradiation dose and the amount of luminescence is represented by a relatively simple curve at a range of 0 to 20 Gy. In the case of irradiation with CuKα rays, the amount of luminescence does not become saturated at 500 Gy or more and can be quantified using a calibration curve.

3. Use

The manganese-containing lithium triborate of the present invention is useful as an element in two-dimensional and three-dimensional dosimeters. In particular, the manganese-containing lithium triborate of the invention is a powder and can be formed into a plate by mixing the lithium triborate into a polymer or the like. Hence, the lithium triborate is also useful in the form of a thermoluminescent laminate for dosimetry which is obtained by lamination of the plates.

EXAMPLES

Reference Example 1

Figure 4:
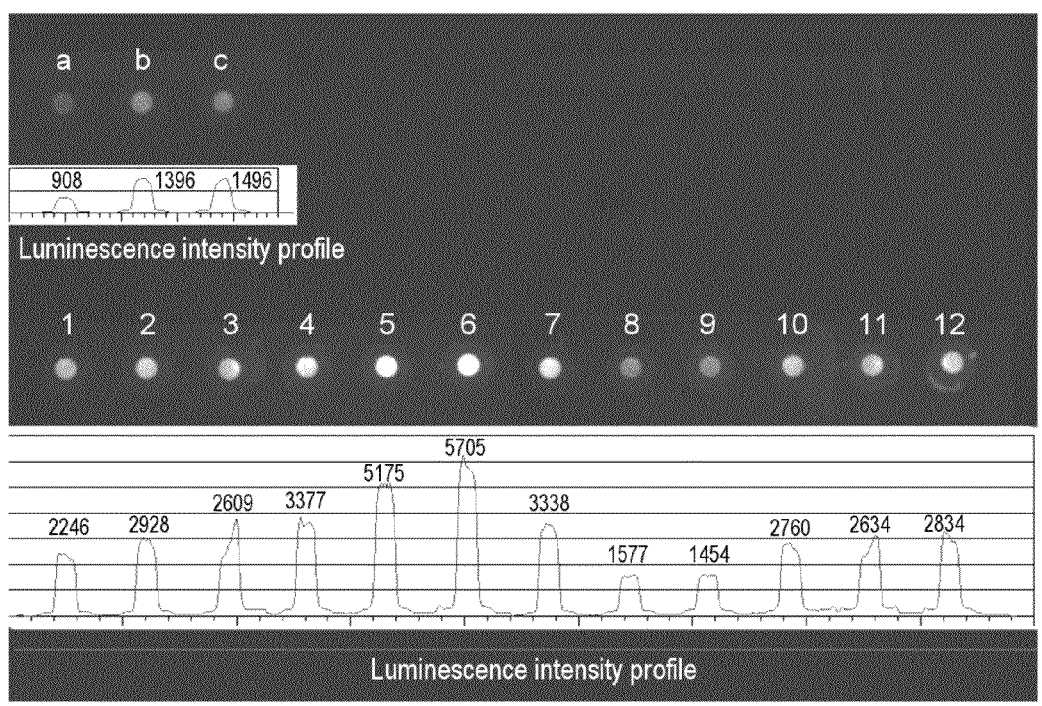
FIG. 4 shows the luminescence intensity of the substances obtained in Reference Example 1, Example 1 and Comparative Example 1.

Equimolar amounts of lithium tetraborate (Nacalai Tesque, Inc.) and boron oxide (Koso Kagaku Yakuhin K. K.) were fired at 800° C. for 2 hours to prepare lithium triborate. The lithium triborate and manganese dioxide (Koso Kagaku Yakuhin K. K.) were mixed and heated in air at 700° C., 750° C. or 800° C. After the resulting products were irradiated with 20 Gy of X rays, they were heated from 140° C. to 240° C. at a temperature increase rate of 0.5° C./sec and the luminescence intensity was measured. The results are shown in FIG. 4. The symbols a, b and c in FIG. 4 indicate the examples in which the heating temperatures were 700° C., 750° C. and 800° C., respectively.

Figure 5:
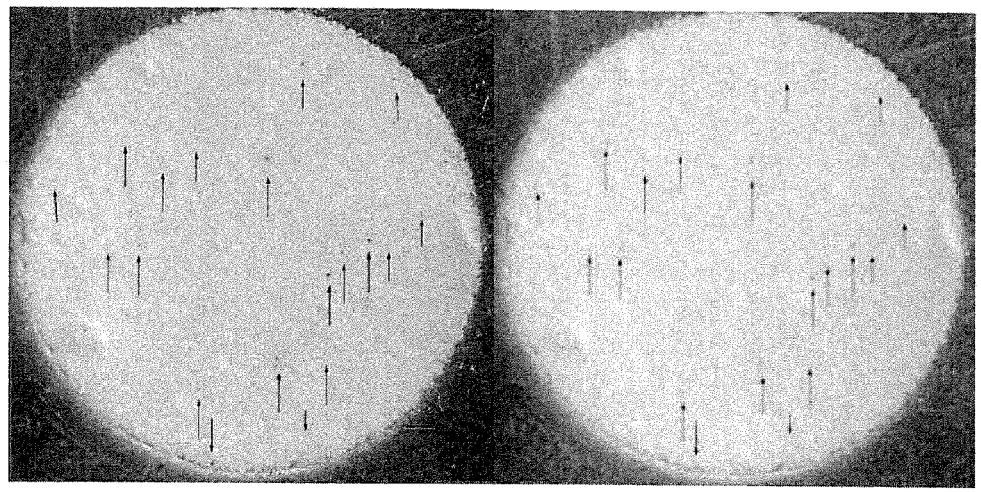
FIG. 5 shows optical micrographs of the substances obtained in Reference Example 1.

As shown in FIG. 4, the products of these examples had low luminescence intensity. FIG. 5 shows optical micrographs of the products. The black particles observed in FIG. 5 (those indicated by the arrows in the figure) are manganese dioxide microparticles, showing that unreacted manganese dioxide remained. From FIGS. 4 and 5, it was speculated that since the manganese dioxide did not sufficiently react in this example, the luminescence intensity of the products was low. That is, it is clear that a desired thermoluminescent phosphor cannot be obtained by mere heating of lithium triborate and manganese dioxide.

Example 1

Step A1: Lithium tetraborate (Nacalai Tesque, Inc.), boron oxide (Koso Kagaku Yakuhin K. K.) and manganese dioxide (Koso Kagaku Yakuhin K. K.) were mixed in the ratios shown in Table 1. It is to be noted that the amount of the manganese dioxide was 0.4 mass % relative to the total amount of the boron oxide and the total amount of the lithium tetraborate.

Step A2: The mixtures were each placed on a platinum plate and fired in an electric furnace at 825° C. for 4 hours.

Step A3: The fired products and additional lithium tetraborate in the amounts shown in Table 1 were mixed and fired at 825° C. for 4 hours to give manganese-containing lithium triborates.

After the thus obtained manganese-containing lithium triborates were irradiated with 20 Gy of X rays, they were heated from 140° C. to 240° C. at a temperature increase rate of 0.5° C./sec and the luminescence intensity was measured.

The results are shown in FIG. 4 and Table 1. The numbers shown in FIG. 4 indicate the branch numbers in Table 1. More specifically, the number "5" in FIG. 4 indicates Example "1-5" in Table 1.

Comparative Example 1

Manganese-containing lithium triborates were obtained and evaluated, in the same manner as in Example 1 except that the molar ratios between the lithium tetraborate and the boron oxide were changed to those as shown in Table 1. The results are shown in FIG. 4 and Table 1.

TABLE 1

| | | Lithium tetraborate in step A1 (Molar proportion) | Lithium tetraborate in step A3 (Molar proportion) | Boron oxide (Molar proportion) | Relative luminescence intensity |
|---|---|---|---|---|---|
| Ex. 1 | -5 | 1 | 1 | 2 | 5175 |
| | -6 | 1 | 2 | 3 | 5705 |
| | -7 | 1 | 3 | 4 | 3338 |
| Comp. Ex. 1 | -1 | 1 | 0 | 0 | 2246 |
| | -2 | 1 | 0 | 0.3 | 2928 |
| | -3 | 1 | 0 | 0.7 | 2609 |
| | -4 | 1 | 0 | 1 | 3377 |
| | -8 | 1 | 4 | 5 | 1577 |
| | -9 | 1 | 5 | 6 | 1454 |
| | -10 | 1 | 6 | 7 | 2760 |
| | -11 | 1 | 7 | 8 | 2634 |
| | -12 | 0 | 1 | 1 | 2834 |

FIG. 4 and Table 1 reveal that the manganese-containing lithium triborates obtained by the present invention have high luminescence intensity.

Example 2

Figure 6:
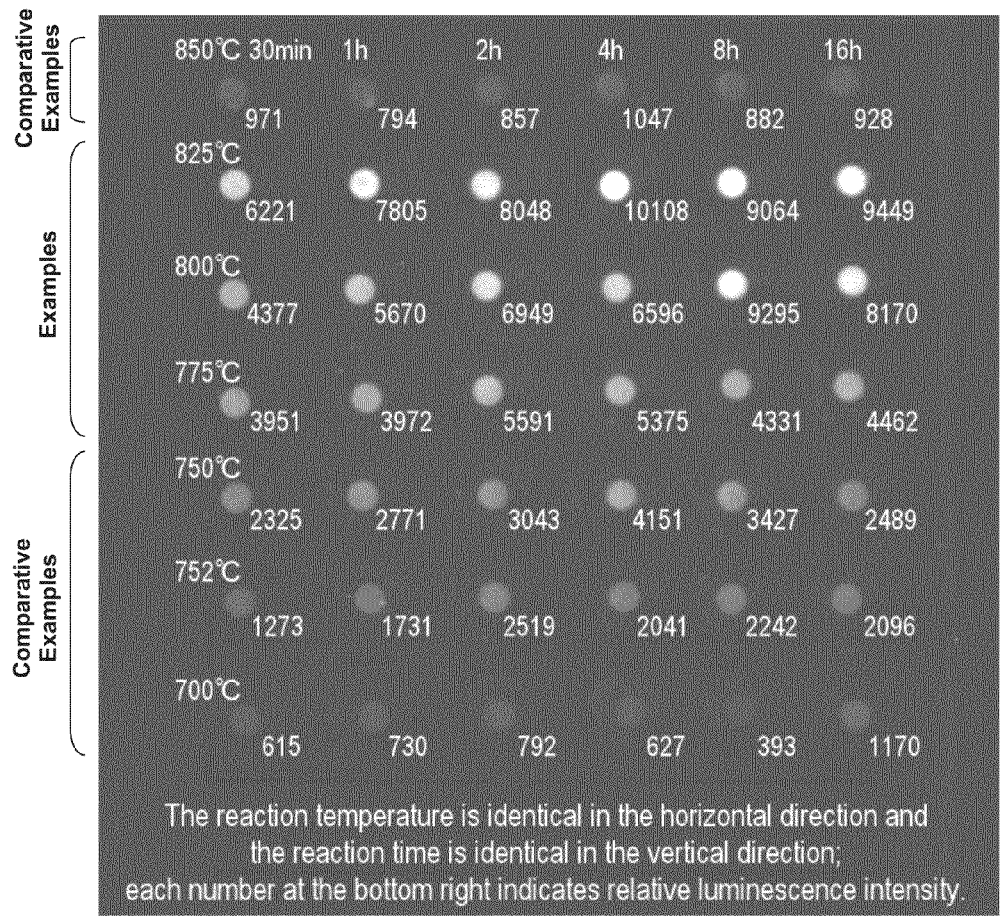
FIG. 6 shows the luminescence intensity of the substances obtained in Example 2 and Comparative Example 2.

Manganese-containing lithium triborates were obtained and evaluated, in the same manner as in Example 1-5 except that the firing conditions applied in the steps A1 and A3 were changed within ranges of 775 to 850° C. and 0.5 to 16 hours. The results are shown in FIG. 6. FIG. 6 shows differences in sintering time in the horizontal direction and differences in sintering temperature in the vertical direction. Each number shown at the bottom right indicates relative luminescence intensity.

Comparative Example 2

Manganese-containing lithium triborates were obtained and evaluated, in the same manner as in Example 1-5 except that the firing conditions applied in the steps A1 and A3 were changed within ranges of 700 to 750° C. and 850° C. and 0.5 to 16 hours. The results are shown in FIG. 6.

FIG. 6 shows that firing at 825° C. for 4 hours or more is best in the composition of Example 1-5. When the firing time is below 4 hours, the luminescence intensity gradually decreases, and when the firing time is 30 minutes, the luminescence intensity is about 60% as high as the luminescence intensity obtained by firing at 825° C. for 4 hours or more. When the firing temperature is 800° C., a product having good luminescence brightness can be obtained by firing for 8 hours or more, while the luminescence intensity gradually decreases when the firing time is below 8 hours. The luminescence intensity obtained by firing for 30 minutes is about 40% as high as the luminescence intensity obtained by firing at 825° C. for 4 hours or more. When the firing temperature is 800° C. or less, the luminescence intensity does not become so high even by firing for 16 hours and is about 40% as high as the luminescence intensity obtained by firing at 825° C. for 4 hours or more. When the firing temperature is 850° C., the luminescence intensity is extremely low.

Figure 7:
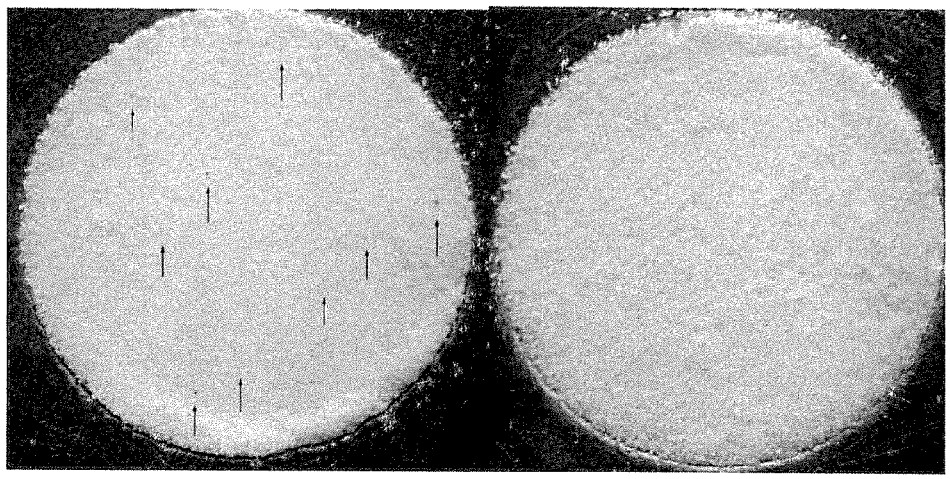
FIG. 7 shows optical micrographs of the substances obtained in Example 2 and Comparative Example 2.
Figure 7:
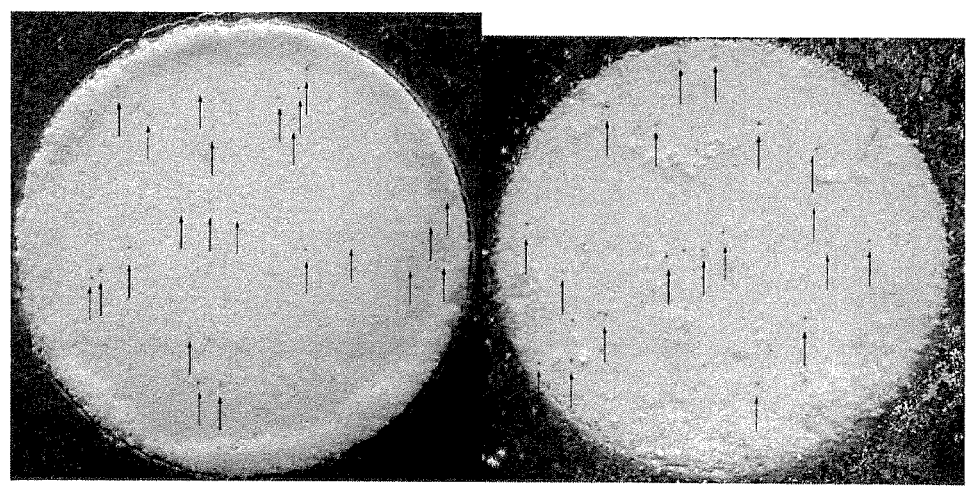

FIG. 7 shows optical micrographs of the substances obtained in Example 2 and Comparative Example 2. When the firing temperature was 825° C., manganese dioxide microparticles were not observed and all of the manganese dioxide was confirmed to have reacted. In the substances fired at temperatures lower than that temperature, a large volume of unreacted manganese dioxide microparticles were observed.

Example 3

Figure 8:
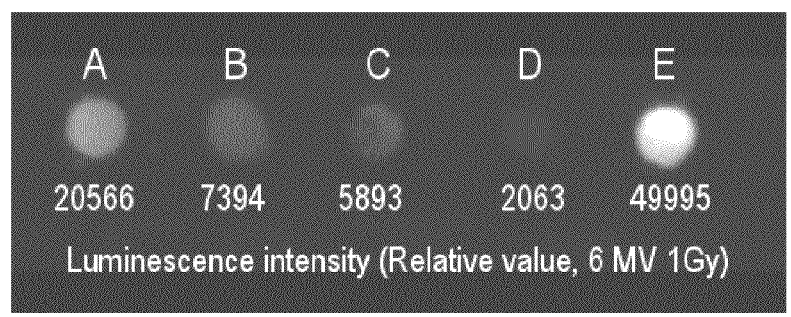
FIG. 8 shows a comparison with other thermoluminescent phosphors.

After the manganese-containing lithium triborate obtained in Example 1-5 was irradiated with 2 Gy of X rays, it was heated at 260° C. for 480 seconds and the amount of luminescence obtained at the time was subjected to an integrating imaging using a FINGERLAKE MICROLINE electronic cooled CCD camera. The result is shown in FIG. 8. In FIG. 8, each number indicates relative luminescence intensity.

Comparative Example 3

Tissue-equivalent theremoluminescent substances other than the manganese-containing lithium triborate obtained by the present invention were prepared and the luminescence intensity was evaluated in the same manner as in Example 3. The results are shown in FIG. 8.

A: $Li_2B_4O_7$:Mn, Al (a substance disclosed in Japanese Patent No. 443170; aluminum- and manganese-containing lithium tetraborate)
B: $Li_3B_7O_{14}$:Cu (a substance disclosed in Non-patent Document 1)
C: Harshow TLD-100 (LiF)
D: Harshow TLD-800 ($Li_2B_4O_7$:Mn)

FIG. 8 shows that the manganese-containing lithium triborate obtained by the present invention is extremely sensitive as compared with the aforementioned other tissue-equivalent theremoluminescent substances. The luminescence intensity of the manganese-containing lithium triborate obtained by the present invention was 2.4 times higher than that of $Li_2B_4O_7$:Mn, Al, 6.8 times higher than that of $Li_3B_7O_{14}$:Cu, 9 times higher than that of TLD-100, and 24 times higher than that of TLD-800.

Example 4

Manganese-containing lithium triborates were obtained and evaluated, in the same manner as in Example 1-5 except that the amount of the manganese dioxide added was changed within a range of 0.02 to 2.00 mass % and that the sintering temperature was 775° C. The results are shown in FIG. 9.

Figure 9:
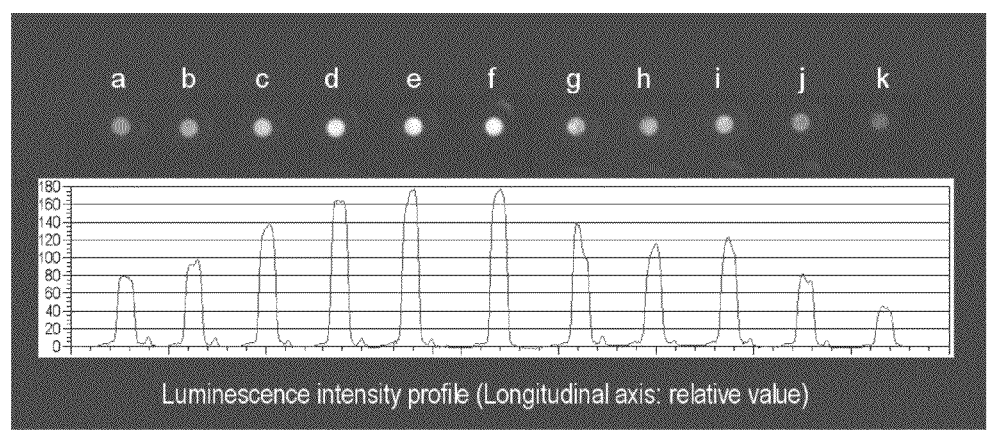
FIG. 9 shows the luminescence intensity of the manganese-containing lithium triborates obtained in Example 4.

In view of FIG. 9, it is deemed that a manganese-containing lithium triborate having high luminescence intensity can be obtained when the concentration of manganese dioxide falls within a range of 0.02 to 0.80 mass %. In addition, FIG. 9 shows that the optimum concentration is 0.10 mass %.

Reference Example 2

Figure 10:
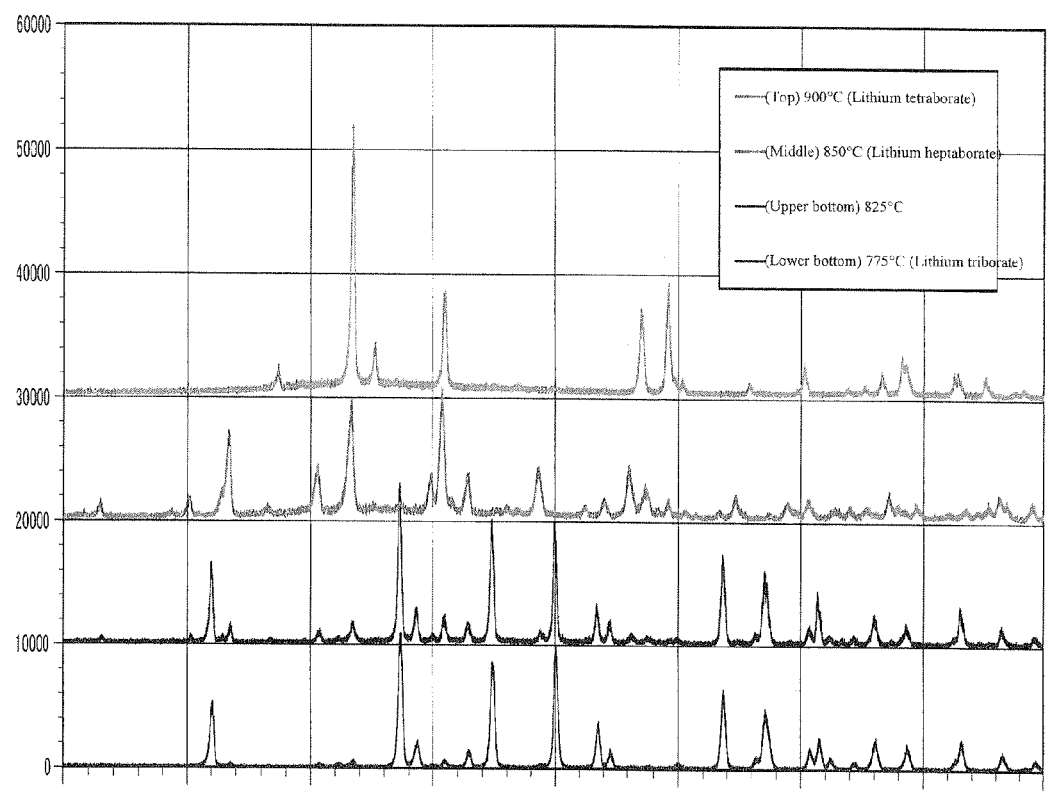
FIG. 10 shows powder X-ray diffraction results.

Products were obtained in the same manner as in Comparative Example 1-4 (i.e., without addition of lithium tetraborate in the step A3) except that the sintering temperature was changed within a range of 775 to 900° C. The powder X-ray diffraction data of the products is shown in FIG. 10. The spectrum of the product sintered at 900° C., which was obtained by sintering at a temperature of 900° C., matched the spectrum of lithium tetraborate. The spectrum of the product fired at 850° C. matched the spectrum of lithium heptaborate. The spectra of the product fired at 775° C. and the product fired at 825° C. matched the spectrum of lithium triborate. Further, the spectra of all the products fired at 700 to 825° C. which were obtained in Example 2 and Comparative Example 2 were found to match the spectrum of lithium triborate. From these findings, it is clear that lithium triborate effectively functions as a thermoluminescent substance.

Example 5

Step B1: One mol of lithium tetraborate, one mol of boron oxide, and manganese dioxide were mixed. It is to be noted that the amount of the manganese dioxide was 0.1 mass % relative to the total amount of the boron oxide and the total amount of the lithium tetraborate.

Step B2: The mixture was put in a platinum crucible and heated in an electric furnace at 880° C. for 1 hour. Subsequently, the temperature in the furnace was changed to 840° C. and cooled slowly to 820° C. over 56 hours. The cooling rate was about 0.3° C./h. After the fired product was left to cool, the platinum crucible was slapped on the outside of the bottom to remove the content and the content was pulverized in a magnetic mortar to give a manganese-containing lithium triborate. A powder X-ray diffraction analysis was conducted, and the obtained manganese-containing lithium triborate was confirmed to consist essentially of lithium triborate and contain slight amounts of lithium tetraborate and lithium heptaborate crystals.

The thermoluminescence property of the manganese-containing lithium triborate was evaluated in the same manner as in Example 1 and the evaluation revealed that luminescence intensity almost equal to the intensity obtained in Example 1 was obtained.

Example 6

A manganese-containing lithium triborate was obtained and evaluated, in the same manner as in Example 5 except that the cooling time in the step B2 was 24 hours (cooling rate: about 0.8° C./h). As a result, it was confirmed that the manganese-containing lithium triborate consisted essentially of lithium triborate. The thermoluminescence property was almost equal to that obtained in Example 5.

Comparative Example 4

A substance was obtained and evaluated, in the same manner as in Example 5 except that the cooling time in the step B2 was 2 hours (cooling rate: 10° C./h). As a result, it was confirmed that the product consisted essentially of lithium tetraborate. The thermoluminescence property was markedly low as compared with that obtained in Example 5.

The invention claimed is:

1. A method for producing a thermoluminescent phosphor, comprising:
   a step A1 for mixing lithium tetraborate, boron oxide and manganese dioxide,
   a step A2 for firing the mixture at 770 m to 840° C., and
   a step A3 for obtaining the thermoluminescent phosphor comprising lithium triborate as a base material and manganese as a luminescent center present in the base material by further adding and mixing lithium tetraborate into the fired product and then firing the mixture at 770 to 840° C.,
   wherein the molar ratio between the lithium tetraborate and the boron oxide in the step A1 is 1:X, provided that 1<X≤4, the amount of the manganese dioxide is 0.02 to 1.0 mass % relative to the total mass of the boron oxide and the total amount of the lithium tetraborate added in the steps A1 and A3, and the amount of the lithium tetraborate in the step A3 is (X-1) mol relative to 1 mol of the boron oxide.

2. The method of claim 1, wherein the X is 2 to 3.

3. The method of claim 1, wherein the temperature of the firing in the steps A2 and A3 is 820 to 830° C. and the time of the firing is 4 hours or more.

4. The method of claim 1, wherein the amount of the manganese dioxide is 0.05 to 0.2 mass %.

5. A method for producing a thermoluminescent phosphor, comprising:
   a step B1 for mixing lithium tetraborate, boron oxide and manganese dioxide,
   a step B2 for firing the mixture at 850° C. or more, and
   a step B3 for obtaining the thermoluminescent phosphor comprising lithium triborate as a base material and manganese as a luminescent center present in the base material by cooling the fired product from 840° C. to 820° C. at a cooling rate of 1.0° C./h or less to convert the fired product,
   wherein the molar ratio between the lithium tetraborate and the boron oxide in the step B1 is 1:(0.5 to 1.5) and the amount of the manganese dioxide is 0.02 to 1.0 mass % relative to the total mass of the lithium tetraborate and the boron oxide.

6. The method of claim 5, wherein the temperature of the firing in the step B2 is 880° C. or more and the time of the firing is 1 hour or more.

7. The method of claim 5, wherein the amount of the manganese dioxide is 0.05 to 0.2 mass %.

* * * * *